United States Patent
Czarnetzki et al.

(10) Patent No.: US 6,307,690 B1
(45) Date of Patent: Oct. 23, 2001

(54) MICROSCOPE WITH LIGHT SOURCE

(75) Inventors: Norbert Czarnetzki; Thomas Scheruebl; Manfred Matthae, all of Jena (DE)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 09/509,272

(22) PCT Filed: Jun. 25, 1999

(86) PCT No.: PCT/EP99/04431

§ 371 Date: Aug. 15, 2000

§ 102(e) Date: Aug. 15, 2000

(87) PCT Pub. No.: WO00/08510

PCT Pub. Date: Feb. 17, 2000

(30) Foreign Application Priority Data

Aug. 4, 1998 (DE) .............................. 198 35 073

(51) Int. Cl.[7] .............................. G02B 5/04; G02B 21/00
(52) U.S. Cl. .......................... 359/837; 359/368; 359/380; 359/639
(58) Field of Search .................... 359/368–390, 359/431–433, 601–609, 613–618, 629–630, 634, 636, 639–640, 831–837

(56) References Cited

U.S. PATENT DOCUMENTS

| | | | |
|---|---|---|---|
| 3,736,060 | * 5/1973 | Mayo | 356/124 |
| 3,796,477 | * 3/1974 | Geraci | 359/511 |
| 4,251,158 | 2/1981 | Kimura | 356/8 |
| 5,801,882 | * 9/1998 | Miyauchi | 359/837 |
| 5,825,535 | * 10/1998 | Biber et al. | 359/380 |

FOREIGN PATENT DOCUMENTS

| | | | |
|---|---|---|---|
| 39 24 702 | * 7/1989 | (DE) | 359/618 |
| 195 11 937 | 10/1996 | (DE) . | |
| 2 272 980 | 6/1994 | (GB) . | |
| 1-180508 | * 7/1989 | (JP) | 359/380 |

\* cited by examiner

Primary Examiner—Thong Nguyen
(74) Attorney, Agent, or Firm—Reed Smith LLP

(57) ABSTRACT

A microscope with incident light input coupling, wherein the light provided for the incident illumination is directed onto the partially reflecting layer of a beam splitter cube and is directed from there through the objective onto the specimen, while the light reflected and/or emitted by the specimen travels back to the partially reflecting layer and passes through the latter into the imaging beam path. In a microscope of this type, the beam splitter cube is provided with a negative spherical curvature at its outer surface facing the objective. Further, instead of the conventional tube lens, there is a combination formed of a converging lens and a diverging lens, wherein the surface curvatures of the converging lens and the diverging lens and the negative spherical curvature effected at the beam splitter cube are adapted to one another in such a way that the back-reflections of the incident illumination in the intermediate image plane are limited to a minimum.

6 Claims, 5 Drawing Sheets

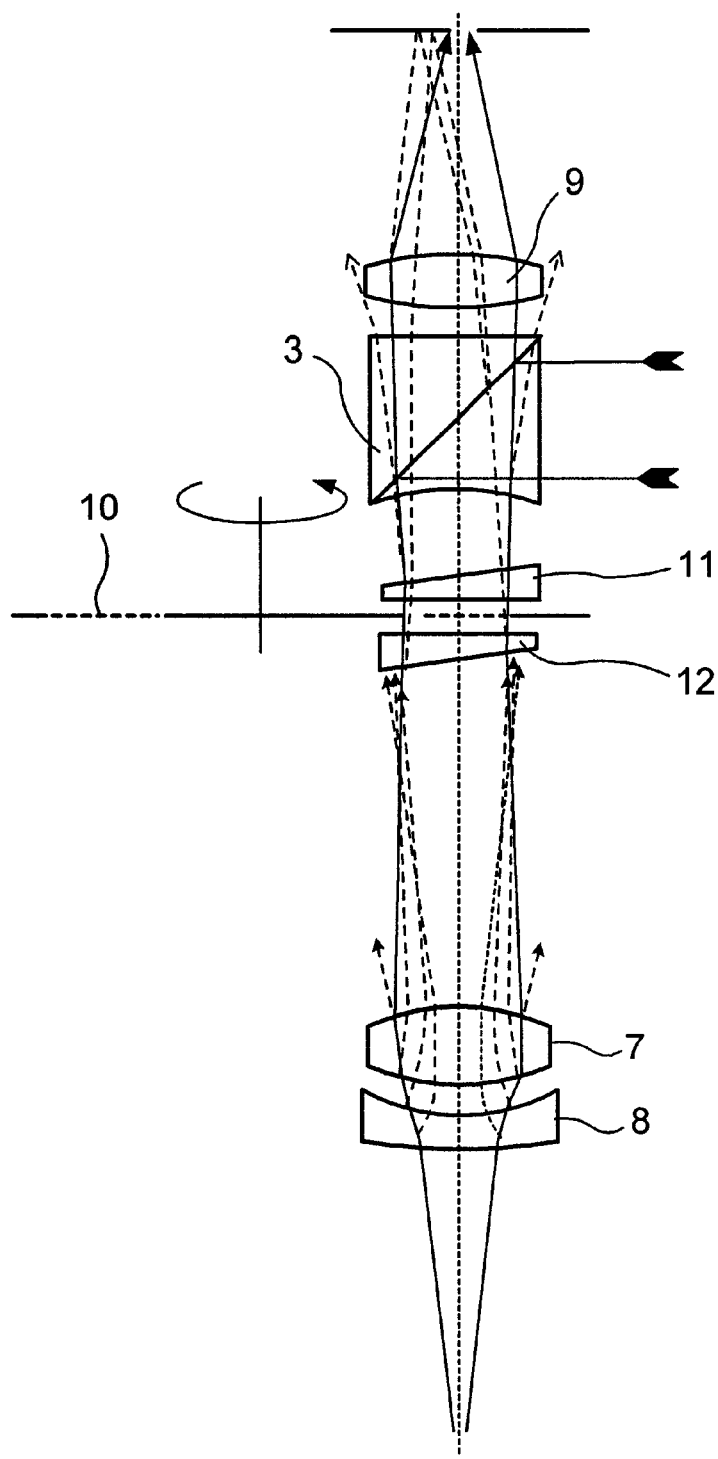
F I G. 3

MICROSCOPE WITH LIGHT SOURCE

BACKGROUND OF THE INVENTION a) Field of the Invention

The invention is directed to a microscope with incident light input coupling, wherein the light provided for the incident illumination is directed to the partially reflecting layer of a beam splitter cube and is directed from there through the microscope objective onto the specimen, while the light reflected and/or emitted by the specimen travels back to the partially reflecting layer and passes through the latter into the imaging beam path.

b) Description of the Related Art

Much more than with transmitted light illumination, the quality of images generated with incident light is characterized by controlling the reflections of optical elements in the beam path that is utilized for both illumination and imaging; these reflections are sometimes extremely troublesome. Therefore, as regards optical design, it must be ensured consistently for each element and each surface in the beam path that the back-reflection of the latter is damped, for instance, by anti-reflection coating of the surface for the relevant spectral region and/or that the position of the ghost image or reflection image of the illumination source (of every surface) is located far away from image planes.

The known steps for eliminating surface reflections on the objectives of the primary tube are directed, above all, to broad-band anti-reflection coating of all lens surfaces of a mounted objective system. In modern design of high-quality objectives for incident light applications, the curvatures of the individual lenses are generally adapted to present-day requirements for low reflection in the intermediate image, aside from the typical requirements for the imaging system for achieving a diffraction-limited transmission of the object plane in the image plane. With most microscope manufacturers, the microscope objectives are corrected to infinity on the image side, i.e., a plane wave surface is generated which first generates a real imaging of the object in the intermediate image plane through the tube lens.

The typical procedure for coupling in the illumination source in incident light applications is neutral, dichroic or polarization-optical input reflection of a parallelized light bundle of the illumination source by means of a plane input-coupling element such as a plane-parallel coated splitter plate or square splitter cube. Accordingly, light is usually coupled into the parallelized infinite beam path between the objective and tube lens. FIG. 1 shows the conventional arrangement for incident illumination in the parallel beam path between the tube lens and objective.

Problems arise with typical incident light input-coupling in the non-parallel, finite beam path of a microscope. When coupling in via an inclined plane plate, aberrations are generated, so that this type of input-reflection of light is not suitable for high-grade optical systems. On the other hand, coupling in via a beam splitter cube between the image plane and tube lens generally generates a relatively strong back-reflection at the lower plane surface of the beam splitter cube. All of the plane surfaces and many optical surfaces with a relatively slight curvature, e.g., the surfaces of the tube lens which usually has a quite long focal length, generate troublesome reflections with incident illumination which reduce the image contrast and imaging quality.

However, particularly with respect to modern microscopy methods, coupling in of incident light between the tube lens and intermediate image plane offers specific advantages, e.g., with respect to the utilization of space in the primary tube of the microscope, so that there is a particular need to solve the problems mentioned above.

An arrangement for low-reflection input-coupling of the illumination source in a parallel confocal incident light microscope is described in DE 19511937 C2. In this case, the neutral, dichroic or polarization-optical input-reflection of the illumination source is carried out above the intermediate image plane and a splitter body which is cut in a rhombic shape is used to prevent troublesome reflections of the plane input-coupling element. In order to reduce the error effect of the rhombus during image formation in the imaging beam path, compensating wedges are required in front of and behind the intermediate image plane. The Nipkow disk, the confocal element in the illumination and imaging beam path, is located in the intermediate image plane and is coated with a broad-band anti-reflection coating, also to prevent troublesome reflections at this element, and arranged in the beam path at a slight inclination.

Another solution for eliminating the troublesome influence of surfaces of plane splitter elements is described in DE 4446134 A1, in which very weak reflections in the fundus oculi must be detected in an interferometric arrangement for measuring the length of the eye. For this purpose, either rhomboidal plane splitter elements or bodies which are slightly skewed but planar are used as splitter elements for coupling in the illumination (semiconductor laser) and for generating a reference beam path of the interferometric measurement principle. These elements are difficult to handle during production as well as for adjustment in the overall arrangement.

In the German Patent DE 19714221 (in contrast to the above-cited DE 19511937 C2), two confocal disks with pinhole arrays are used for preventing strong interfering reflections proceeding from the illumination so that the primary illumination reflections are not even allowed to reach the imaging arm. This is effected at the expense of a complicated adjustment for producing the conjugation of the illumination array to the pinhole array.

OBJECT AND SUMMARY OF THE INVENTION

Based on this prior art, it is the primary object of the invention to improve the image quality and therefore the utility value properties in a microscope of the type described above by reducing the influence of false light.

This object of the invention is met in that the beam splitter cube has a negative spherical curvature at its outer surface facing the objective.

Due to the spherical surface curvature carried out at the beam splitter cube, the latter acts like a piano-concave lens, so that the back-reflections of the incident illumination in the intermediate image plane are reduced because the light reflections of this surface are sharply reduced by the concave surface produced on the splitter.

This effect is reinforced in an arrangement of the invention by providing a combination of a diverging lens and a converging lens, wherein the surface curvatures of the diverging lens and converging lens and the negative spherical curvature effected at the beam splitter cube are adapted to one another in such a way that the back-reflections of the incident illumination in the intermediate image plane are limited to a minimum. This is achieved through a deliberate and defined increase in the radius curvatures of the two lenses and of the curved surface at the beam splitter cube. In so doing, the splitter body acts optically as a thick piano-concave lens (negative lens). The diverging lens, the converging lens and the negative spherical curvature effected at the beam splitter cube replace the tube lens that is conventionally provided.

According to the invention, it is provided in a further constructional variant that the diverging lens—for purposes of achieving sharply curved radii—is formed as a curved negative lens (biconcave lens) and the converging lens is formed as a biconvex lens, both lenses working together with the polished concave surface at the beam splitter cube as was described above. As a result, the negative optical action of the beam splitter and light bundle expansion by means of the above-mentioned diverging lens with an increased positive refractive power acts in opposition to the converging lens in a compensating manner.

This increase in the refractive power of the converging lens results in greater surface curvatures at the relevant optical elements and accordingly in a substantially stronger dispersive behavior with respect to the resulting back-reflections.

In this way, the disadvantages of incident light coupling are extensively eliminated by two relatively sharply curved diverging lenses and a relatively sharply curved converging lens which cooperate as a substitute tube lens. While coupling in of light between the tube lens and microscope intermediate image by conventional means (standard splitter and tube lens) leads to unacceptable false light problems, the described arrangement offers the possibility of a substantially improved suppression of interfering reflections.

Further, this arrangement opens up possibilities for expanding the functionality of the optical primary tube. Accordingly, it is provided according to the invention that both the converging lens and the diverging lens are arranged so as to be displaceable individually or jointly in the direction of the image plane, wherein the distance between the two lenses and/or between the two lenses and the image plane can be changed as a result of the displacement, which results in a change in the resulting focal length.

Therefore, zoom effects can be achieved within a small area by varying the distance, resulting in advantages for applications in which it is necessary to calibrate the magnification in the microscope primary tube with exactness. As is well known, the magnification scale of the primary tube in its entirety is subject to certain fluctuations because of typical manufacture-related deviations of the magnification scale of objectives of the same type and of the focal length of standard tube lenses.

To enable exact calibration of the primary tube in scale, a zoom characteristic of the tube system is desirable in order that the magnification scale of the primary tube in its entirety can be calibrated by varying the focal length. For this purpose, a known scale can be imaged via the primary tube on a camera and the magnification scale can be measured. For calibration, the tube system is tuned, i.e., its total focal length is adjusted to a suitable measure by changing the air clearance.

By changing the distance between the diverging lens and the converging lens or by displacing both of these lenses jointly, it is possible to vary the total focal length (although within tight limits), and, therefore, the linear magnification or imaging scale, without a substantial decline in imaging quality. The variation of the total focal length is given by the following equation:

$$f_a - f_e = \frac{d_a - d_e}{(f_2 + f_1 - d_a)(f_2 + f_1 - d_e)}$$

The variation of the intersection length or back focus is given by the following equation:

$$s'_a - s'_e = \frac{(f_2 - d_a) \times f_1}{(f_1 + f_2 - d_a)} - \frac{(f_2 - d_e) \times f_1}{(f_1 + f_2 - d_e)}$$

where $f_a$ is the total focal length before the adjustment, $f_e$ is the total focal length after the adjustment, $f_1$ is the focal length of the converging lens, $f_2$ is the focal length of the diverging lens, $d_a$ is the distance between the converging lens and diverging lens before the adjustment, $d_e$ is the distance between the converging lens and diverging lens after the adjustment, $s_a'$ is the back focus before adjustment and $s_e'$ is the back focus after the adjustment (see FIG. 4).

For example, this offers the possibility of an important application for achieving an exact optical imaging scale in automatic inspection machines in which the cell-to-cell comparison is carried out principally in periodic storage memory modules.

With regard to the optical inspection of periodic structures in semiconductor components, high productivities are achieved with inspection since the same optical structures and therefore the same electronic signals should occur within a receiver field. The electronic signals can be inspected immediately for absolute identity by fast hardware without buffering. However, this procedure is only reliable when no aliasing effects occur, i.e., when the optical length of a freely selectable period structure gives a whole pixel quantity in exact subpixels. This is possible optically only when the imaging scale of the period length which generally differs in circuit structures of different degrees of integration, with different manufacturers, techniques or the like is adjusted very exactly and dynamically to the camera characteristics (pixel size).

In this context, another construction of the invention provides that the converging lens and/or the diverging lens are/is coupled with a motor-driven actuating member and this actuating member is connected with a device for issuing actuating commands.

A sensitive adjustment of the zoom characteristics in the parallel confocal primary tube of an inspection device is made possible by means of suitably designed motor-driven actuating members. The dynamic adjustment of the imaging scale in a secondary imaging specifically to a receiver circuit with a confocal character entails very great difficulties.

The invention will be described more fully in the following with reference to a embodiment example.

BRIEF DESCRIPTION OF THE DRAWINGS

In the drawing:

FIG. 3 the application of incident light input-coupling according to the invention in connection with a field lens;

DESCRIPTION OF THE EMBODIMENTS

Figure 1:
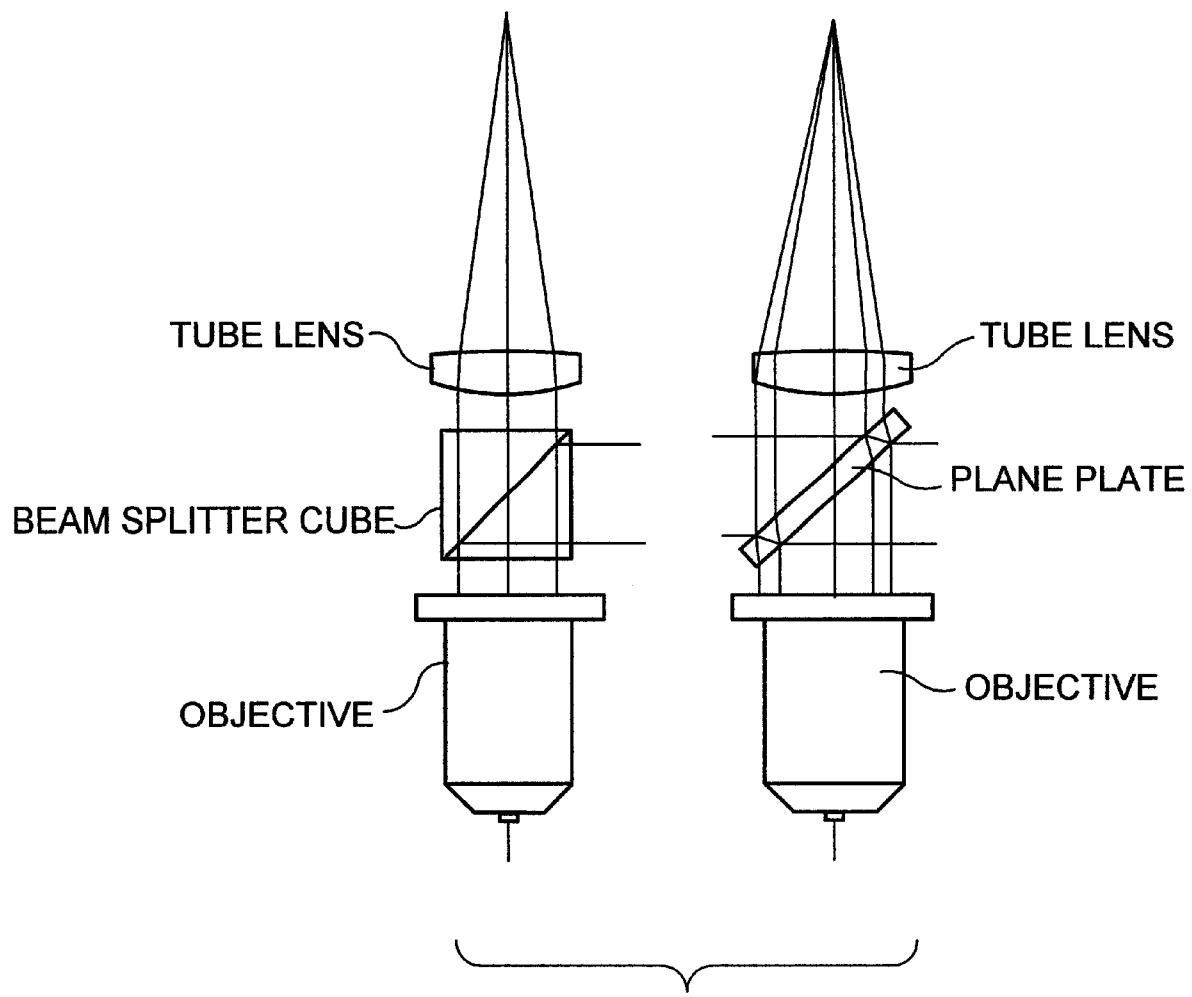
FIG. 1 the principle of incident light input-coupling according to the prior art.
Figure 2:
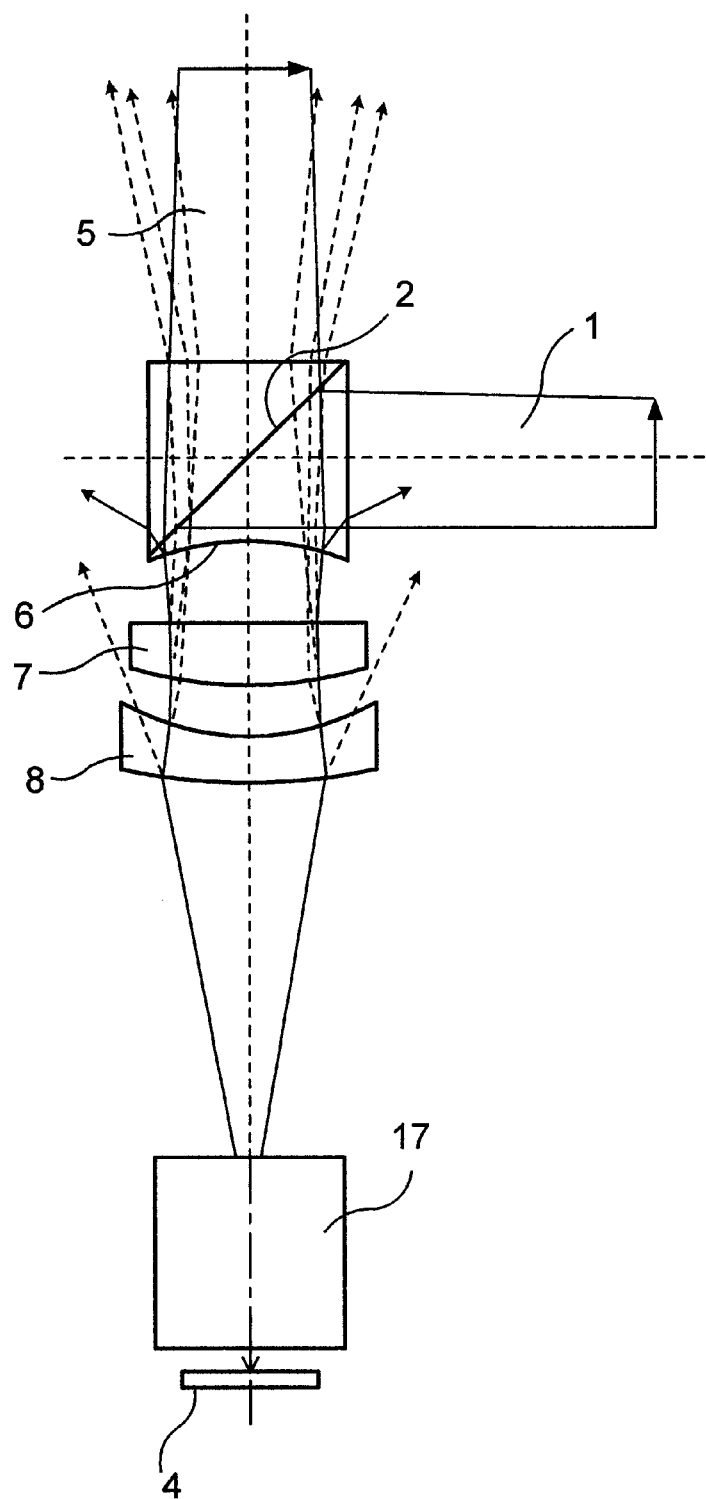
FIG. 2 the principle of incident light input-coupling according to the invention.

In contrast to the prior art which is shown in FIG. 1 and which was already mentioned in the introductory part of the specification, the incident light input-coupling for a microscope corresponding to the invention is shown in FIG. 2. In this case, the illumination beam path 1 provided for incident illumination is directed onto the partially reflecting layer 2 of a beam splitter cube 3. The inclined position of the partially reflecting layer 2 causes the deflection of the illumination beam path 1 in the direction of a specimen 4. The light reflected and/or emitted by the specimen 4 travels back to the partially reflecting layer 2 and passes through the latter into the imaging beam path 5.

According to the invention, the beam splitter cube 3 has a negative spherical curvature at its outer surface 6 which faces the specimen 4 and, therefore, the imaging objective 17.

Further, a converging lens 7 and a diverging lens 8 are arranged in the beam path between the beam splitter cube 3 and the imaging objective 17. The surface curvatures of the converging lens 7, the diverging lens 8 and the curvature of the outer surface 6 are adapted to one another in such a way that, through their cooperation, the interfering secondary illumination reflections are suppressed to a minimum. This is achieved in that the beam splitter cube 3 which acts as a thick plano-concave lens during the passage of the imaging beam path due to the curvature of the outer surface 6 produces a negative optical effect, as does the light bundle expansion of the diverging lens 8.

According to the invention, the negative optical action of the beam splitter 3 and diverging lens 8 acts in opposition to the converging lens 7 with a relatively high refractive power. The increase in the refractive power leads in the converging lens to larger surface curvatures and accordingly to the desired increased dispersive behavior of the back-reflections. Accordingly, the disadvantages of the prior art with respect to incident light input-coupling between the tube lens and image plane are eliminated to a great extent.

FIG. 3 shows the construction of the arrangement according to the invention with reference to an example with a Nipkow disk as a confocal element in the illumination and imaging beam path in which the negatively curved outer surface 6 at the beam splitter cube 3 cooperates with a field lens 9 as a substitute field lens. In this case, also, a converging lens 7 and a diverging lens 8 are provided, wherein the Nipkow disk 10 is arranged so as to be inclined in the intermediate image plane in the beam path between the beam splitter cube 3 and the converging lens 7, and wherein a pair of wedges 11, 12 is associated with the Nipkow disk 10.

Figure 4:
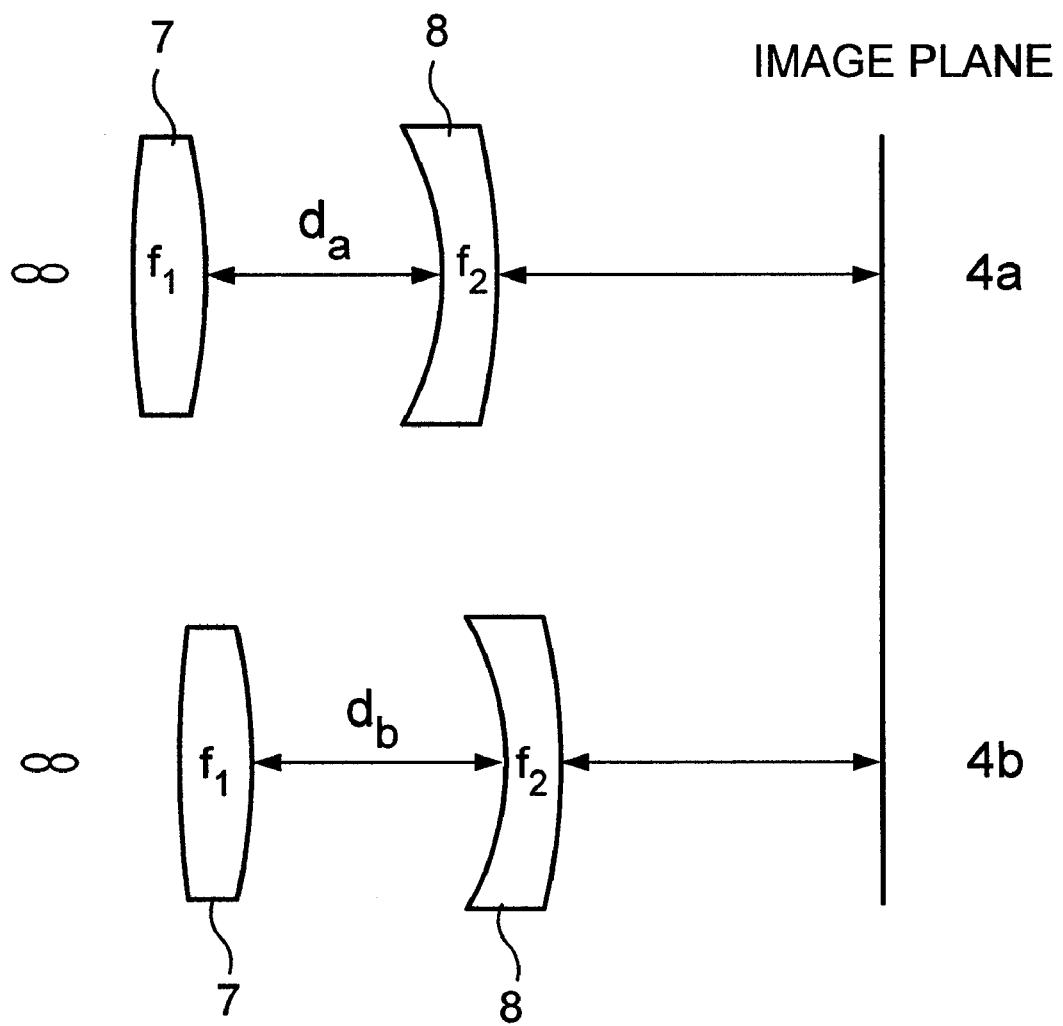
FIG. 4 a view illustrating the change of the focusing state.

FIG. 4 shows, by way of example, the focusing state with reference to the diverging lens 8 and the converging lens 7. At FIGS. 4a and 4b, the converging lens 7 has focal length $f_1$, the diverging lens 8 has focal length $f_2$. By varying the distance between the converging lens 7 and the diverging lens 8 or simultaneously displacing the lens group comprising the converging lens 7 and diverging lens 8, it is possible to vary the total focal length within close limits and accordingly to change the imaging scale without substantially worsening the imaging quality.

The variation of the total focal length is given by $\Delta f = f_a - f_e$ and the variation in the back focus is given by $\Delta s = s_a - s_e$ corresponding to the equations indicated in the preceding description in which the influence of the focal lengths $f_1$, $f_2$ and distance d in the variation of the total focal length and back focus is thoroughly described.

Figure 5:
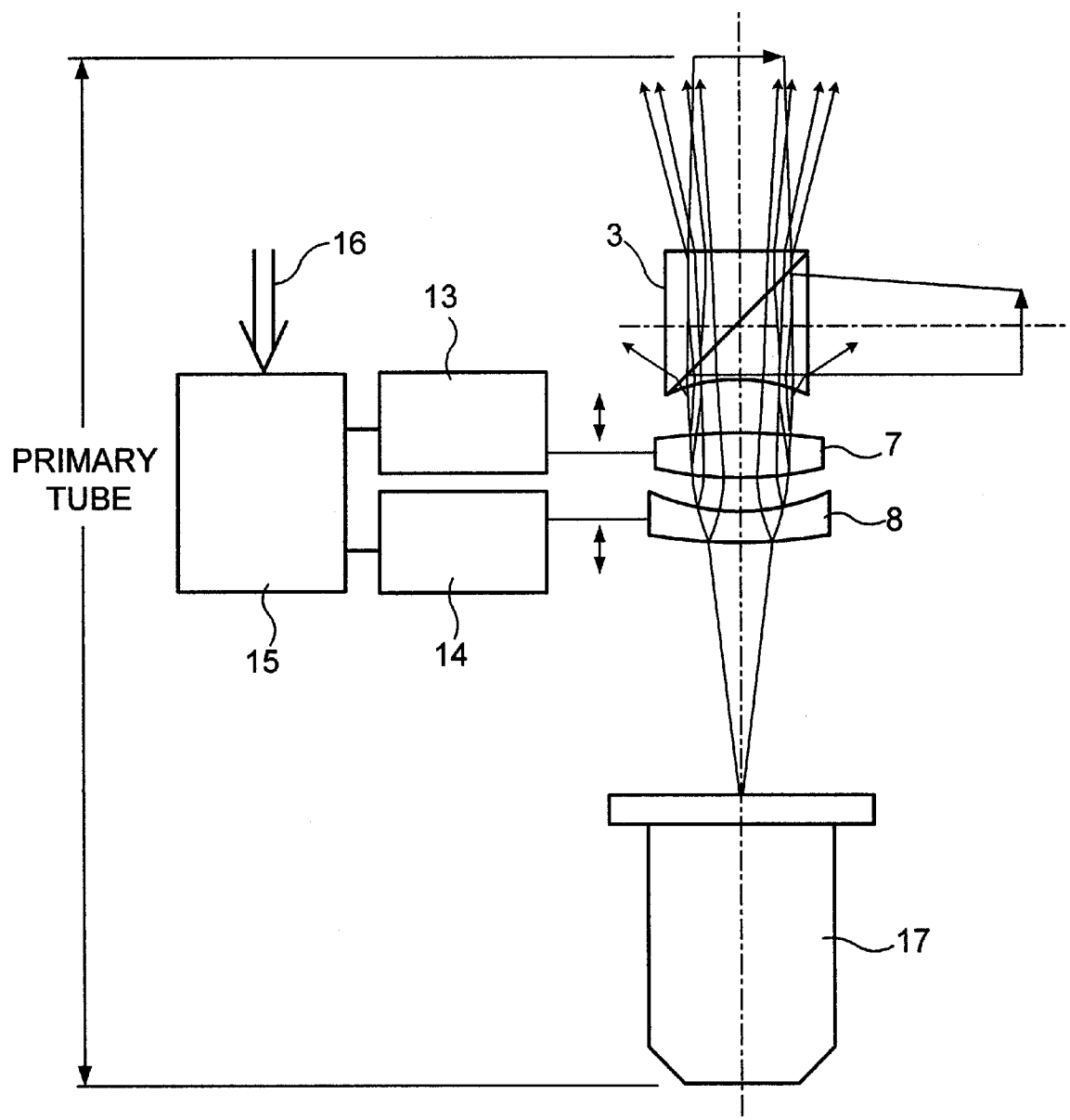
FIG. 5 an arrangement with changeable focusing state.

FIG. 5 shows an application example for varying the focal length by changing the distance between the converging lens 7 and diverging lens 8 or the disstance between the converging lens 7 and diverging lens 8 and the beam splitter cube 3. In this case, the converging lens 7 is coupled with an actuating member 13 and the diverging lens 8 is coupled with an actuating member 14. Both actuating members 13 and 14 are connected with a control unit 15 which has an input module 16 for entering actuating commands.

When actuating commands are entered via the input module 16 (manually or automatically), a displacement of the converging lens 7 and/or diverging lens 8 is caused via the control unit 15 and actuating members 13 and 14; in so doing, the converging lens 7 and/or diverging lens 8 move on a guide in the direction of the beam path. When this happens, the total focal length and the back focus change corresponding to the equation given above. In this way, this arrangement opens up possibilities for expanding the functionality of the optical primary tube for purposes of an exact calibration of magnification.

While the foregoing description and drawings represent the present invention, it will be obvious to those skilled in the art that various changes nay be made therein without departing from the true spirit and scope of the present invention.

REFERENCE NUMBERS 1 illumination beam path
2 partially reflecting layer
3 beam splitter cube
4 specimen
5 imaging beam path
6 negatively curved outer surface
7 converging lens
8 diverging lens
9 field lens
11, 12 wedge pair
13, 14 actuating member
15 control unit
16 input module
17 imaging objective

What is claimed is:

1. A microscope with incident light input-coupling comprising:
    a beam splitter cube having a partially reflecting layer;
    an imaging objective;
    light provided for incident light illumination being directed onto a partially reflecting layer of said beam splitter cube and being directed from there by way of said imaging objective onto a specimen;
    light emanating from the specimen traveling back to the partially reflecting layer and passing through said layer in an imaging beam path; and
    said beam splitter cube having a negative spherical curvature at its outer surface facing the imaging objective.

2. The microscope according to claim 1, said microscope including a tube lens system, wherein a converging lens and a diverging lens are provided in said tube lens system, wherein surface curvatures of the diverging lens, converging lens and beam splitter cube, which acts as a piano-concave lens due to the surface curvature, are adapted to one another in such a way that secondary illumination reflections are limited to a minimum.

3. The microscope according to claim 2, wherein the converging lens is formed as a biconvex lens and the diverging lens is formed as a biconcave lens.

4. The microscope according to claim 2, wherein both the converging lens and the diverging lens are arranged so as to be displaceable individually or jointly toward or away from the image plane, wherein the distance between the two lenses and/or between the two lenses and the image plane can be changed as a result of the displacement, which results in a change in a focal length.

5. The microscope according to claim 4, wherein the converging lens and the diverging lens are coupled with motor-driven actuating members and are connected via the latter with a control unit and with an input module for entering actuating commands.

6. The microscope according to claim 1, wherein a confocal element is arranged in an intermediate image plane, wherein a diverging lens and a converging lens are provided in a tube lens system and a field lens is provided in an imaging beam path, wherein the surface curvatures of the converging lens, the diverging lens, the beam splitter cube, which acts as a plano-concave lens due to the surface curvature, and the field lens are adapted to one another in such a way that secondary illumination reflections are limited to a minimum.

* * * * *